UNITED STATES PATENT OFFICE.

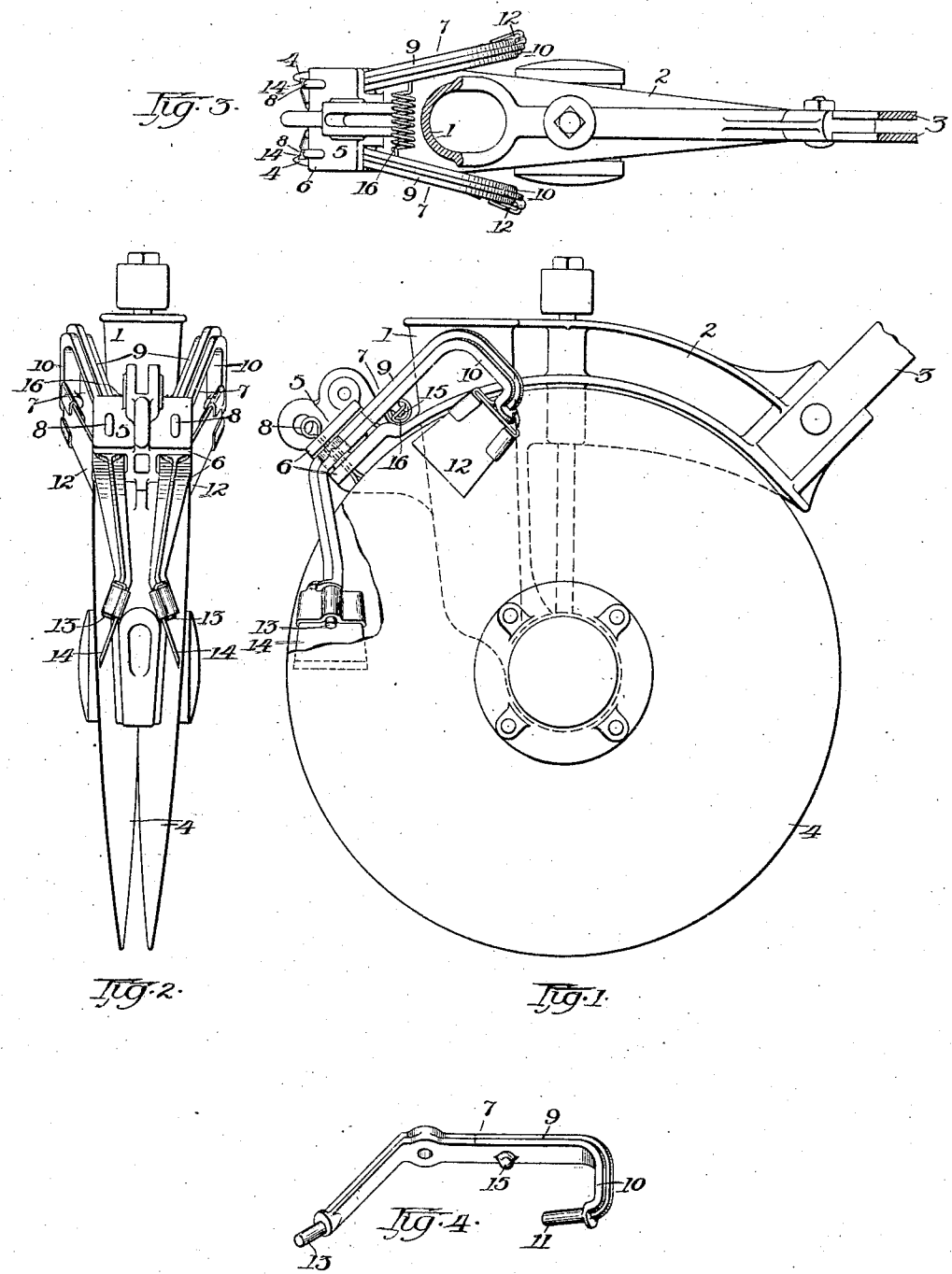

ROBERT C. LIVESAY, OF BERWYN, ILLINOIS, ASSIGNOR TO INTERNATIONAL HARVESTER COMPANY, A CORPORATION OF NEW JERSEY.

GRAIN-DRILL.

No. 845,425.　　　Specification of Letters Patent.　　　Patented Feb. 26, 1907.

Application filed December 21, 1906. Serial No. 348,840.

*To all whom it may concern:*

Be it known that I, ROBERT C. LIVESAY, a citizen of the United States, residing at Berwyn, in the county of Cook and State of Illinois, have invented certain new and useful Improvements in Grain-Drills, of which the following is a specification.

My invention relates to grain-drills, and particularly to the furrow-openers when comprised of pairs of angularly-arranged rotatable disks suitably mounted upon opposite sides of the grain-boot and adapted to open a furrow in advance of the delivery end thereof for the reception of the seed, the object of the invention being to provide improved means for mounting the disk-scrapers in a manner that may be yieldingly held in operative position against both the inner and outer surfaces of the disks and readily adapt themselves to slight irregularities of movement thereof, said means comprising a minimum of parts for the purpose required. I attain this object by the mechanism illustrated by the accompanying drawings, in which—

Figure 1 represents a side elevation of a double-disk furrow-opener embodying my invention. Fig. 2 is a rear view of Fig. 1. Fig. 3 is a top plan view of Fig. 1, and Fig. 4 is a perspective view of one of the scraper-holders.

Similar reference-numerals designate similar parts throughout the several views.

1 represents a boot; 2, a forwardly-projecting arm integral therewith; 3, drag-bars having their rear ends secured to the arm; 4, disk furrow-openers rotatably mounted upon opposite sides of the lower end of the boot and having their forward edges inclined toward the line of draft; 5, a bracket projecting rearward and formed integral with the boot and having laterally-projecting ear portions 6 upon opposite sides thereof that are inclined rearward and downward from the boot and adapted to receive between them scraper-holders 7, that are provided with openings intermediate their ends for the reception of pins 8, passing through each pair of ears and the holders, the holders being loosely mounted between the ears and upon the pins in a manner permitting a free movement thereof in a lateral direction to a limited extent for a purpose to be described later. Each scraper-holder has a body portion 9, inclined forward and laterally from its pivotal connection and provided with a downwardly-turned leg portion 10, having a rearwardly and downwardly extending shank portion 11, forming a part thereof and arranged substantially parallel with the body portion 9.

12 is a scraper-blade loosely mounted upon the shank 11 in a manner having a limited vibratable movement about its axis and adapted to contact with the outer surface of the disk. Each holder projects rearward, inward, and downward from its pivotal connection and is provided with a shank portion 13, adapted to receive a scraper-blade 14, arranged to contact with the inner surface of the disk in the same manner as the blade 12 contacts with the outer surface thereof.

The holders are provided with hook portions 15 forward of their pivotal connections, and 16 is a coiled spring having its opposite ends engaging with the hooks and operative to yieldingly draw the forward ends of the holders inward and toward each other in a manner to cause the scrapers at opposite ends of the holders to impinge against opposite surfaces of the disks, and any inequalities in the surfaces or irregularity of movement of the disks is compensated for by means of the loose connection at the pivotal bearings of the holders, the latter being free to vibrate about their pivots and also to move to a limited extent bodily in either direction or rock upon their supports at an angle with their pivotal axes, and the single spring is operative in a manner to yieldingly hold all four scrapers in contact with the disks.

What I claim as my invention, and desire to secure by Letters Patent, is—

1. In a grain-drill, the combination of a boot, rotatable disks mounted upon opposite sides of said boot and having their forward edges inclined toward each other, a pair of scraper-holders pivotally supported intermediate their ends, each having scrapers attached to opposite ends thereof and adapted to impinge against opposite surfaces of the same or one of the disks, and a single spring operative to yieldingly hold the scrapers in contact with the disks.

2. In a grain-drill, the combination of a boot, rotatable disks mounted upon opposite sides of said boot and having their forward edges inclined toward each other, a pair of scraper-holders pivotally supported intermediate their ends and arranged substantially parallel with each other, scrapers attached to opposite ends of each holder and adapted to impinge against opposite surfaces of the same or one of the disks, and a single spring operative to yieldingly hold the scrapers in contact with the disks.

3. In a grain-drill, the combination of a boot, rotatable disks mounted upon opposite sides of said boot and having their forward edges inclined toward each other, a pair of scraper-holders pivotally mounted upon said boot intermediate their ends and arranged substantially parallel with each other, scrapers attached to opposite ends of each holder and adapted to impinge against opposite surfaces of the same or one of the disks, and a single spring operative to yieldingly hold the scrapers in contact with the disks.

4. In a grain-drill, the combination of a boot, rotatable disks mounted upon opposite sides of said boot and having their forward edges inclined toward each other, a pair of scraper-holders pivotally mounted upon said boot intermediate their ends, said holders being arranged substantially parallel with each other and inclined rearwardly and downwardly, scrapers attached to opposite ends of each holder and adapted to impinge against opposite surfaces of the same or one of the disks, and a spring operatively connecting the forward ends of said holders in a manner to yieldingly hold the scrapers in contact with the disks.

5. In a grain-drill, the combination of a boot, rotatable disks mounted upon opposite sides of said boot and having their forward edges inclined toward each other, a pair of scraper-holders pivotally mounted upon said boot intermediate their ends, said holders comprising forwardly-extending body portions having downwardly-extending leg portions provided with shanks substantially parallel with the body portions, scrapers vibratably mounted upon said shanks and adapted to impinge against the outer surface of the same or one of the disks, said holders also provided with rearwardly and downwardly extending body portions provided with shanks, scrapers vibratably mounted upon said shanks and adapted to impinge against the inner surfaces of the same or one of the disks, and a coiled spring connecting the forward portion of the holders and adapted to yieldingly draw them toward each other.

ROBT. C. LIVESAY.

Witnesses:
EUGENE J. CURRAN,
RAY PATTISON.